US005653874A

United States Patent [19]

Berry, III

[11] Patent Number: 5,653,874
[45] Date of Patent: Aug. 5, 1997

[54] SELF-CLEANING SCREEN FOR A PUMP INLET BAY

[75] Inventor: Russell M. Berry, III, Clovis, Calif.

[73] Assignee: Claude Laval Corporation, Fresno, Calif.

[21] Appl. No.: 471,721

[22] Filed: Jun. 6, 1995

[51] Int. Cl.⁶ .................... B01D 29/64; B01D 29/68
[52] U.S. Cl. .................... 210/159; 210/162; 210/170; 210/408; 210/411; 210/413
[58] Field of Search .................... 210/159, 162, 210/170, 407, 408, 409, 411, 413, 415

[56] References Cited

U.S. PATENT DOCUMENTS

| | | | |
|---|---|---|---|
| 1,180,564 | 4/1916 | Burnard | 210/159 |
| 3,112,263 | 11/1963 | Ellilä | 210/411 |
| 3,390,775 | 7/1968 | Bosch | 210/413 |
| 4,169,792 | 10/1979 | Dovel | 210/159 |
| 4,287,064 | 9/1981 | Ando et al. | 210/413 |
| 4,415,462 | 11/1983 | Finch et al. | 210/162 |
| 4,929,122 | 5/1990 | Yoas | 210/407 |
| 5,094,751 | 3/1992 | Ramsey et al. | 210/408 |
| 5,356,541 | 10/1994 | Wickzell | 210/411 |

*Primary Examiner*—Stanley S. Silverman
*Assistant Examiner*—Theodore M. Green
*Attorney, Agent, or Firm*—Donald D. Mon

[57] ABSTRACT

A fish-excluding, self cleaning screen forming at least part of the boundary between a body of water such as a stream, and a bay from which water is to be withdrawn. On the bay side of the screen is a hub with a plurality of rotating wands that discharge water against the bay side of the screen to flush screen apertures and provide a periodic variation in flow through the screen to discourage passage of fish. Optional brushes may periodically brush the bay side of the screen to assist in cleaning the apertures.

6 Claims, 2 Drawing Sheets

SELF-CLEANING SCREEN FOR A PUMP INLET BAY

FIELD OF THE INVENTION

A self-cleaning screen to resist passage of fish and detritus along with water entering an inlet bay. A pump inlet draws water from the inlet bay.

BACKGROUND OF THE INVENTION

It is a commonplace situation for a pump intake to be placed in a body of water such as a river, lake, or an estuary. Generally it is placed to one side of any major stream flow in a relatively quiescent region. In this invention, such a region is for convenience described as a "bay". In fact, a screen according to this invention may and often will be at least a part of the boundary of the bay.

Bodies of water with which this invention is concerned are likely to have a considerable burden of material such as leaves, branches and vines. In addition, and of Great importance to this invention, fish often swim in them, and unless care is taken they will be drawn into the pump.

Laws protective of such fish, especially of smaller wild fish—salmon for example, provide very serious penalties for the discovery of even one of these fish in an inlet bay, or at the downstream side of the pump. The penalties can include very substantial monetary fines, and even worse, an injunction against withdrawing water from the body of water.

Intake pumps for irrigation systems commonly have screens to exclude fish and detritus, but the rate of flow of water adjacent to the intake port of the pump is such as to draw the solid material against the screen and quite possibly clog it. Screens have in fact been provided close to intake ports, but because they are located at the region of rapid water flow to the pump, lesser screen aperture sizes used to exclude solids can compromise the rate of flow to the pump.

It is an object of this invention to provide a screen which comprises a part of the boundary of a bay in which the intake port of a pump is disposed. This screen is provided with apertures that are suitably sized to exclude fish of "penalty" size. Because such apertures are likely to be clogged by detritus, the screen is provided with self-cleaning means which have the dual function of clearing the apertures and of discouraging fish from attempting to swim through the screen apertures.

BRIEF DESCRIPTION OF THE INVENTION

A self-cleaning screen according to this invention is placed in a body of water from which water is to be pumped from a pump inlet to a point of use. The body of water may be such as a river, lake or estuary, for example. The intake port of the pump is placed in a bay in that body of water, the bay being at least partially bounded by a screen according to this invention. Accordingly the pump intake draws water from a bay, which water has passed through the screen of this invention.

The screen of this invention has screen apertures whose size will exclude "penalty" fish and most detritus to be found in such bodies of water. While it will be best practice also to provide a screen at the pump intake itself, depending on the installation it may not be necessary. What can be assured is that no "penalty" fish should be found swimming in the bay.

Depending on the nature of the installation, the screen might not need cleaning means. However, in most agricultural applications there will be a substantial burden, and there will be a risk that the screen will clog. According to this invention, in order to prevent this event, a backwash jet of water periodically impacts the bay side of the screen. Additionally, a brush may periodically be passed along the bay side surface to loosen material caught on the screen so it can be washed away from the opposite side in the body of water.

According to a preferred but optional feature of the invention the screen is placed parallel to the stream flow when the source of water is a flowing stream.

The above and other features of the invention will be fully understood from the following detailed description and the accompanying drawings, in which:

DETAILED DESCRIPTION OF THE INVENTION

Figure 1:
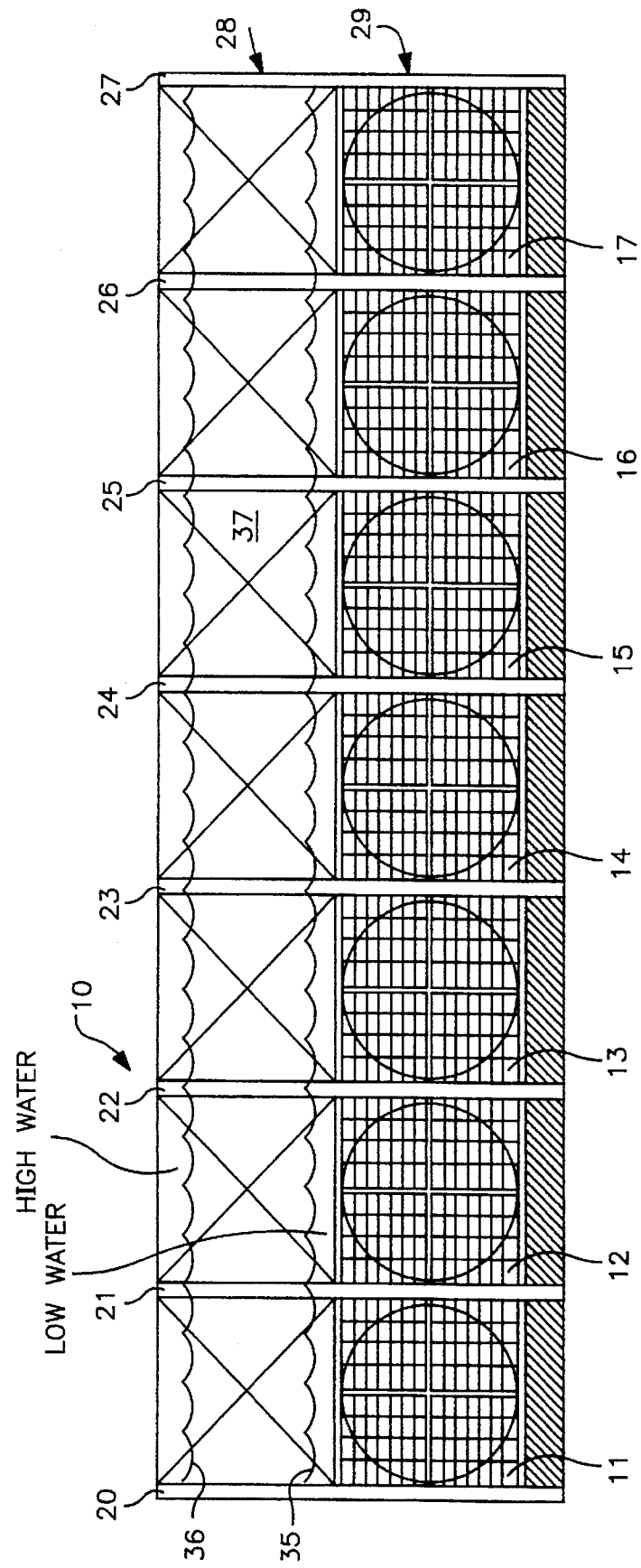
FIG. 1 is a frontal vertical view of the system of this invention, looking at it from the entering body of water.

FIG. 1 shows a fish protection screen 10 having seven panels 11–17. These panels are parallel to one another, and are vertically supported between respective pairs of uprights 20–27, to which their edges are fastened. The panels are conveniently formed in an upper row 28 and a lower row 29. For convenience in disclosure, only the lower row is shown in detail. The upper row is shown schematically to enable the anticipated water levels to be seen. The upper and lower rows may be duplicates of each other, with all related equipment, or the upper row may be solid panels if preferred.

A characteristic low water level 35 and a high water level 36 are shown. When the panels are installed in a flow stream such as a river or estuary, these panels will most advantageously be placed parallel to the stream flow, because the stream flow will assist in keeping the screen clean. However, this is not a limitation on the invention.

Figure 3:
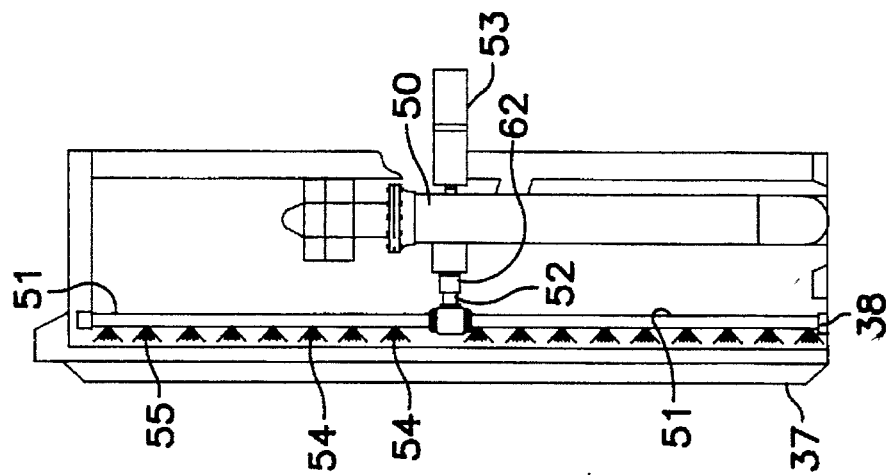
FIG. 3 is a right hand side view of FIG. 2.
Figure 2:
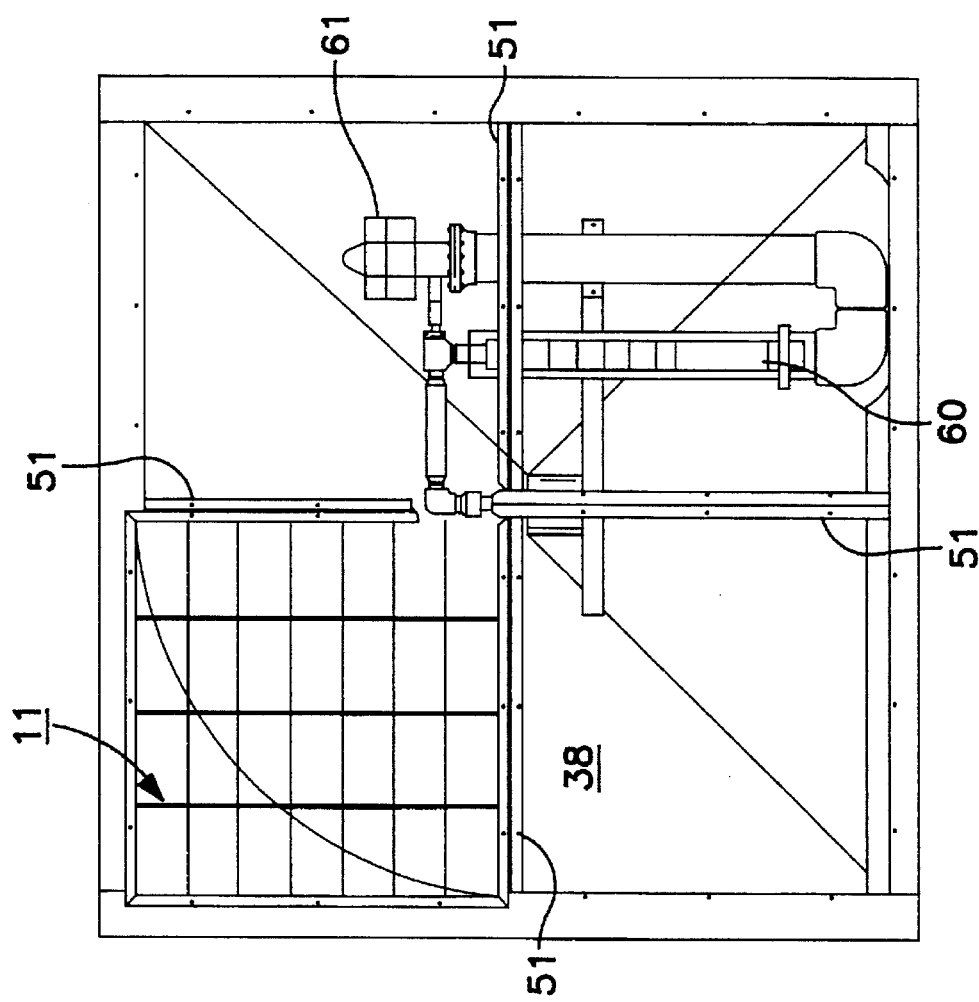
FIG. 2 is a view similar to FIG. 1 showing one unit of the system, with several of its screws removed for purposes of illustration.

It is desirable to create a "bay" of which the screen panels constitute a part of its boundary. Imperforate panels may be installed to complete the bay enclosure from which water is to be pumped, and can even form the entire boundary of the bay except for the part formed by the screens. In this way the bay can project into the body of water, or can even be completely surrounded by it. FIG. 1 shows the face 37 on the body side. Face 38 facing the bay is shown in FIG. 3.

These screens are intended for use where the volume of pumped water is quite large. The screen which corresponds to the specific example herein is designed to pass about 30 cfs of water through each screen in each row. This is a substantial rate of flow which will attract detritus and fish to the screen. When the screens are placed parallel to the stream flow, the tendency of the detritus to impact on and stick to the screen is reduced, but it still exists. Also the screens can confront the stream flow if desired, increasing the risk.

To mitigate this risk, a backwash jet system 50 is placed in the bay. A rotating group of wands 51, conveniently two or more in number, are mounted to a horizontal hub 52. The wands extend radially from the hub, and rotate in a plane which is perpendicular to the axis of the hub, and parallel to the screens. This hub is driven by a motor 53. The wands are hollow tubes with spaced-apart nozzles 54 that will discharge lets 55 of water against the bay side of the screen. Of course some corners of the screens will not be impacted by these jets, but the convenience of the circular mounting outweighs any disadvantage of an "uncovered" area.

A submerged pump 60 in the bay draws water which has already been screened through a submerged pump inlet screen 61, and pumps it to a rotary coupling 62, through the hub, and to the wands.

If desired, a spirally-wound brush (not shown) can be attached to the rotational wand system ahead of each wand so as to give a primary scrub to the bay side of the screen before the jets of water arrive. These brushes may or may not rotate around their own axes, and are optional.

A suitable specification for the screens is as follows:

Woven metal screen with square apertures

Screen size 6×6 feet.

Weave wire, 0.032 inch diameter

Opening width 0.101 inches

Diagonal width 0.142 inches

50% open area.

The operation of the device is straightforward. The wands are driven by the hub, and the jets are directed against the bay side of the screen. The jets are preferably spaced about 8 inches from the screen. Adjacent jets make a partially overlapping spray pattern. The pressure and flow rate in the wand system are selected such that when the jets impact on a screen opening there is a some backflow of water through the screen opening.

This backflow, with or without previous brushing, will dislodge most detritus from the screen and move it out into the stream to be washed away. Fish approaching the screen will be periodically repulsed by the momentary reverse flow, and will tend to be discouraged from attempting to swim through the screen. Of course the screen size has been selected to exclude fish above a given size, but this feature provides considerable reassurance.

This invention is not to be limited by the embodiment shown in the drawings and described in the description, which is given by way of example and not of limitation, but only in accordance with the scope of the appended claims.

I claim:

1. A screen system to resist passage of fish and detritus along with water to be pumped from an inlet bay located in a body of water such as a lake, river or estuary, comprising:

a planar screen submerged in and disposed substantially upright in said body of water, forming at least part of the boundary of said inlet bay, and separating it from said body, said screen having a bay side and a body side, and perforations with dimensions through it of such size and shape as to exclude fish larger than a defined size;

a hub having a substantially horizontal axis of rotation;

a plurality of wands mounted to said hub, extending radially from said hub and in a plane normal to said axis of rotation, said wands having a central passage;

a plurality of jets mounted to each of said wands, fluidly connected to respective central passages in said wands, said wands being spaced from said screen on the bay side of said screen, with the jets directed toward said bay side of screen, said plane being parallel to said screen;

means to rotate said hub;

pump means to draw water from said inlet bay which has already passed through said screen and to discharge said water to said wands, whereby with said pump supplying water under pressure to said wands, and said wands being rotated, jet streams of water will be directed against the bay side of said screen to dislodge detritus from said screen and to discourage the passage of fish through said perforations.

2. A screen system according to claim 1 in which a plurality of brushes is attached to said hub to scrub across said bay side of the screen when the hub is rotated.

3. A screen system according to claim 1 in which said perforations are square, said screen being made of woven wire.

4. A screen system according to claim 1 which includes a plurality of rows of said screens each with a respective hub and plurality of wands on each said hub.

5. A screen system according to claim 4 in which said screens are disposed parallel to the direction of stream flow when installed in a flowing stream.

6. A screen system according to claim 1 in which said screen is disposed parallel to the direction of stream flow when installed in a flowing stream.

* * * * *